(12) United States Patent
Connor, Jr. et al.

(10) Patent No.: US 7,716,498 B1
(45) Date of Patent: May 11, 2010

(54) POWER CONTROL IN A DATA STORAGE SYSTEM

(75) Inventors: Thomas J. Connor, Jr., Winchendon, MA (US); Robert P. Valentine, Auburn, MA (US)

(73) Assignee: EMC Corporation, Hopkinton, MA (US)

( * ) Notice: Subject to any disclaimer, the term of this patent is extended or adjusted under 35 U.S.C. 154(b) by 935 days.

(21) Appl. No.: 11/169,460

(22) Filed: Jun. 29, 2005

(51) Int. Cl.
*G06F 1/00* (2006.01)

(52) U.S. Cl. ..................................................... 713/300
(58) Field of Classification Search .................. 713/300
See application file for complete search history.

(56) References Cited

U.S. PATENT DOCUMENTS

| | | | |
|---|---|---|---|
| 6,191,499 B1 * | 2/2001 | Severson et al. .............. 307/31 |
| 7,254,749 B2 * | 8/2007 | Abrahams et al. .............. 714/47 |
| 2004/0093533 A1 * | 5/2004 | Chapuis et al. ................ 714/22 |
| 2006/0134936 A1 * | 6/2006 | Sullivan et al. ............... 439/61 |

* cited by examiner

*Primary Examiner*—Thomas Lee
*Assistant Examiner*—Mohammed H Rehman
(74) *Attorney, Agent, or Firm*—Krishnendu Gupta; Scott A. Ouellette

(57) ABSTRACT

A network attached storage system includes at least one data moving device coupled to a control station for receiving commands from the control station, each of the at least one data moving devices including a board having mounted thereon a file server portion and a power control portion, wherein the power control portion receives a continuous power supply and controls the application of power to the file server portion based on commands from the control station.

6 Claims, 6 Drawing Sheets

POWER CONTROL IN A DATA STORAGE SYSTEM

FIELD OF THE INVENTION

This invention relates generally to the field of storage and more particularly to a method and apparatus for providing scalable data storage.

BACKGROUND OF THE INVENTION

As is known in the art, Network Attached Storage (NAS) is a data storage mechanism that allows a host device to access storage devices using an Internet Protocol (IP) network. NAS devices are generally file servers that are referenced using IP addresses and are coupled to storage media, such as a RAID array or the like. The NAS therefore serves as a gateway between the storage media and the network. One example of the use of NAS can be found in the Celerra NS600 Network Server, from EMC Corporation of Hopkinton Mass. which includes a front end NAS enclosure and a back end Clariion storage enclosure.

One advantage of the NAS structure is that it enables data storage, data security and data management to be centralized in an environment with many servers running different operating systems. In addition, the use of a NAS-based system such as the Celerra system from EMC is a simple and straightforward way for a host to expand its storage capacity through the use of existing IP host functionality.

Although NAS-based systems are useful, to provide consistent, high performance client support, businesses typically rely on high availability systems. In the prior art, high availability characteristics have been added to a NAS system by duplicating the data mover front end enclosure. For example, a block diagram of an exemplary NAS architecture 10 with some high availability characteristics is shown in FIG. 1. The NAS 10 includes a pair of data mover enclosures 16a and 16b which control the movement of data to and from the attached storage device (not shown). In the example of FIG. 1, each data mover enclosure is shown to include two data movers, which together provide some level of high availability to the overall NAS by enabling continued data mover operation in the event of a single point of failure. A control station 12 is used to monitor the operating status of the data movers. A switch is disposed between the control station 12 and the data mover enclosures 16a and 16b for forwarding control information between the control station and the data movers. Data that is read from or written to the data storage device is forwarded to and from the data movers via an External Local Area Network (LAN), not shown.

Although the NAS architecture 10 provides some level of high availability, because the architecture uses only a single switch and control station, a single point of failure can cause the control system to fail, and therefore the system may not have the required rate of reliability.

FIG. 2 shows an exemplary high availability NAS architecture which overcomes single point of failure issues. The high-availability NAS 20 includes two control stations 12 and 22 coupled via two switches to the two data mover enclosures 16a and 16b. In the event of a single point of failure at any of the components, the remaining component can cover for the failed component while it is repaired.

The solution of FIG. 2 is thus capable of providing high availability support in a NAS environment. One particular problem with such an arrangement, however, involves the physical connections between the individual components of the system. Each line in FIG. 2 that connects one component to another component represents a connection between the components, such as an Ethernet cable. As the components are doubled, the number of cables is linearly increased to ensure that all necessary connections for supporting the high availability system can be maintained. For example, the four cables that were previously used to couple the data movers to the switch are increased to eight cables. The sheer number of cables that would need to fit within the enclosure makes such an arrangement undesirable, and makes any further scaling of the design prohibitive.

Referring briefly to FIG. 3, a diagram of the exemplary NAS enclosure system of FIG. 2 is shown illustrating the clutter of cables within the enclosure, including Ethernet cables from the switches 14 and 24 to the components, and control cables (for example RS485 control cables) from the control stations 12 and 22 to the components.

SUMMARY OF THE INVENTION

The present invention includes a number of data mover devices coupled to a control station wherein each data mover has a network switch incorporated into the data mover structure. In order to control the power supplied to the data mover, the data mover includes a power control portion thereof that is always supplied with power. This "always on" power control portion of the data mover includes the associated switch, a microcontroller and a power control device. Upon receiving a command through the switch from the control station to power down the data mover, the microcontroller sends a command to the power control device, which disables the voltage regulators that supply power to the CPU and I/O logic that make up the data mover. Likewise, upon receiving a command from the control station to power up the data mover, the microcontroller instructs the power control device to enable the voltage regulators that supply power to the CPU and I/O logic that make up the data mover.

BRIEF DESCRIPTION OF THE DRAWINGS

These and other features of the invention will become more readily apparent from the following detailed description when read together with the accompanying drawings, in which.

DETAILED DESCRIPTION

Figure 1:
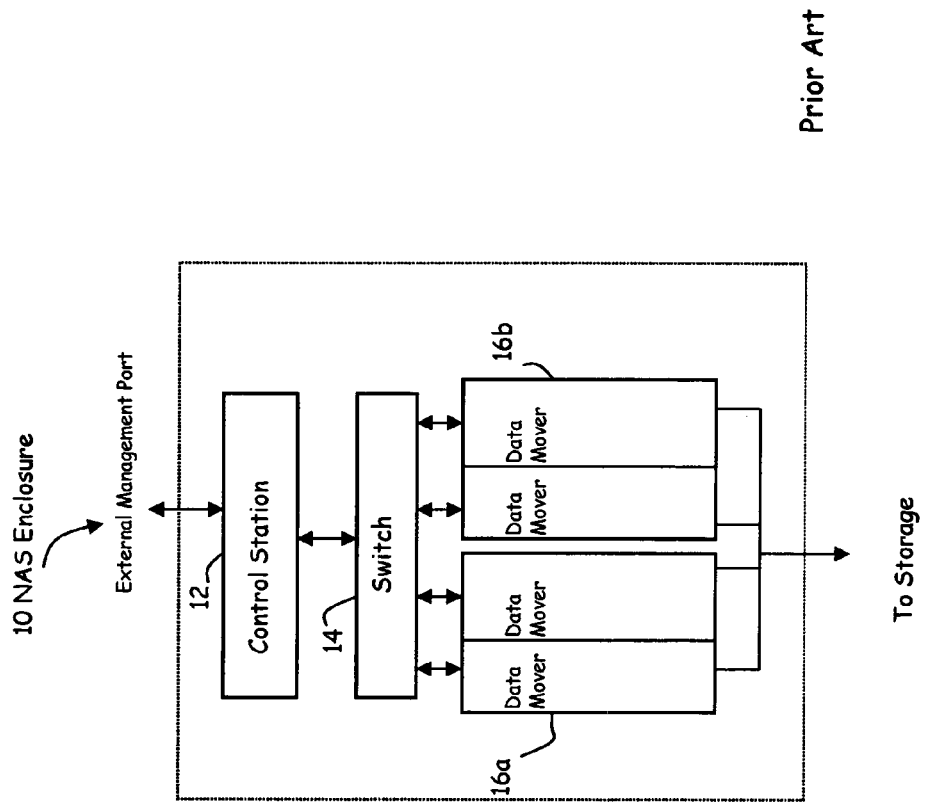
FIG. 1 is a block diagram of an exemplary Network Attached Storage (NAS) system.
Figure 2:
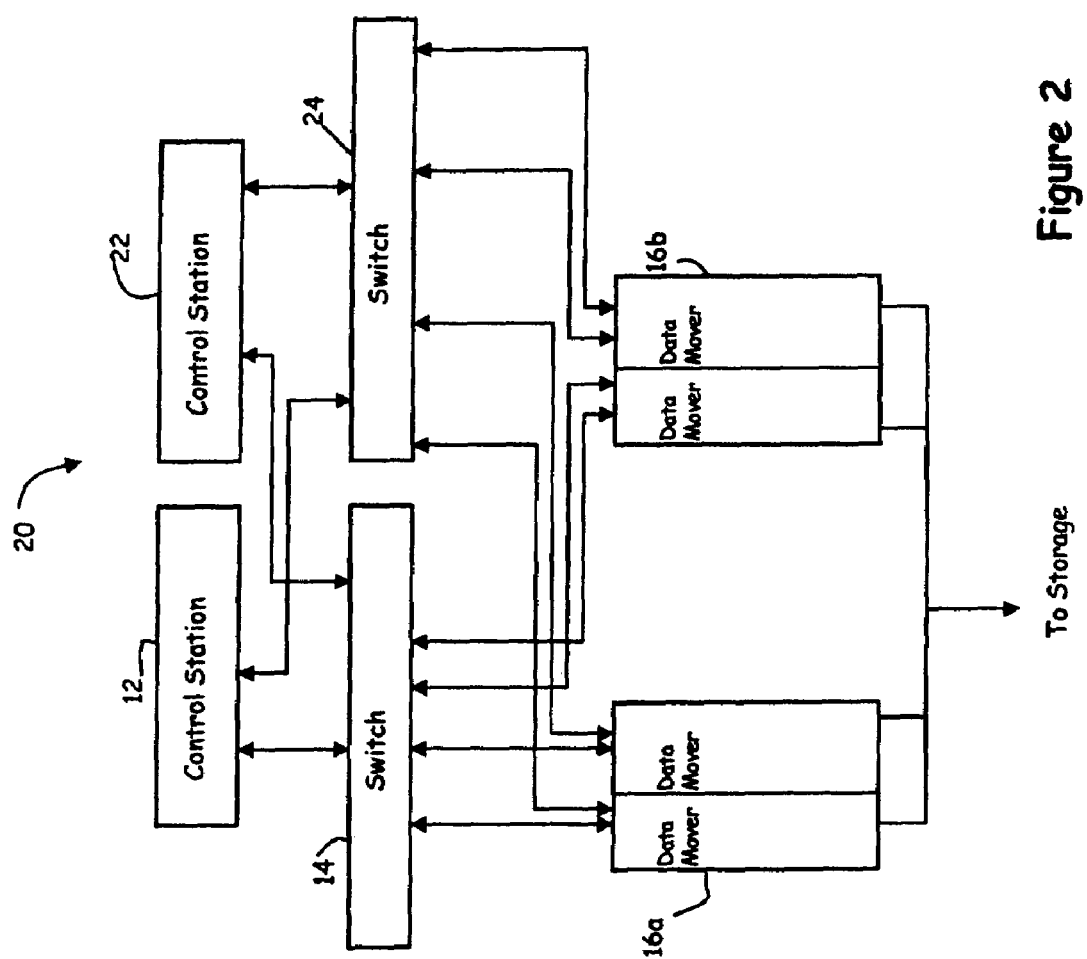
FIG. 2 and FIG. 3 are a block diagram and enclosure diagram, respectively, provided for illustrating connectivity issues involved in modifying the NAS of FIG. 1 to provide high availability reliability.
Figure 3:
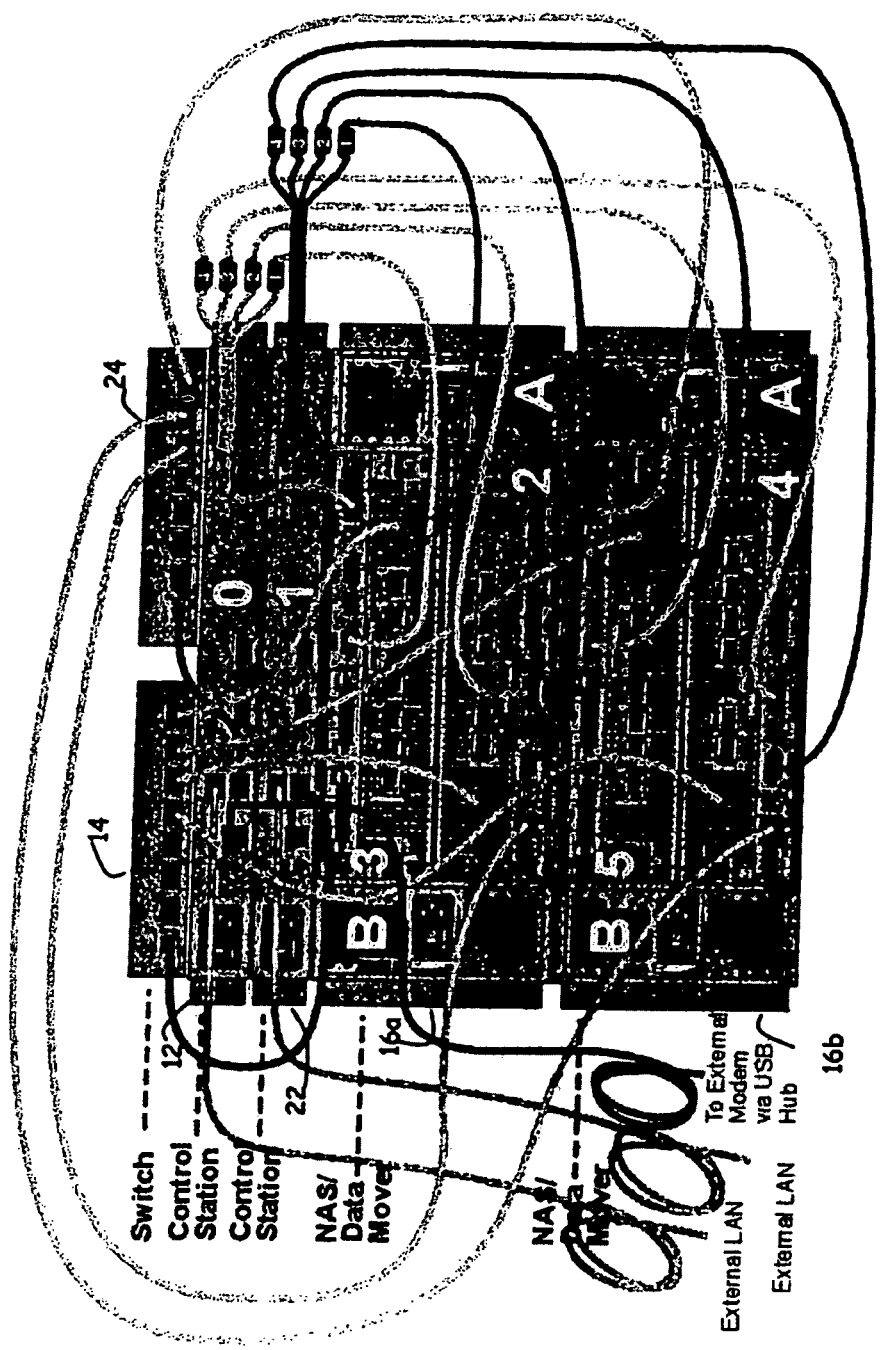
Figure 4:
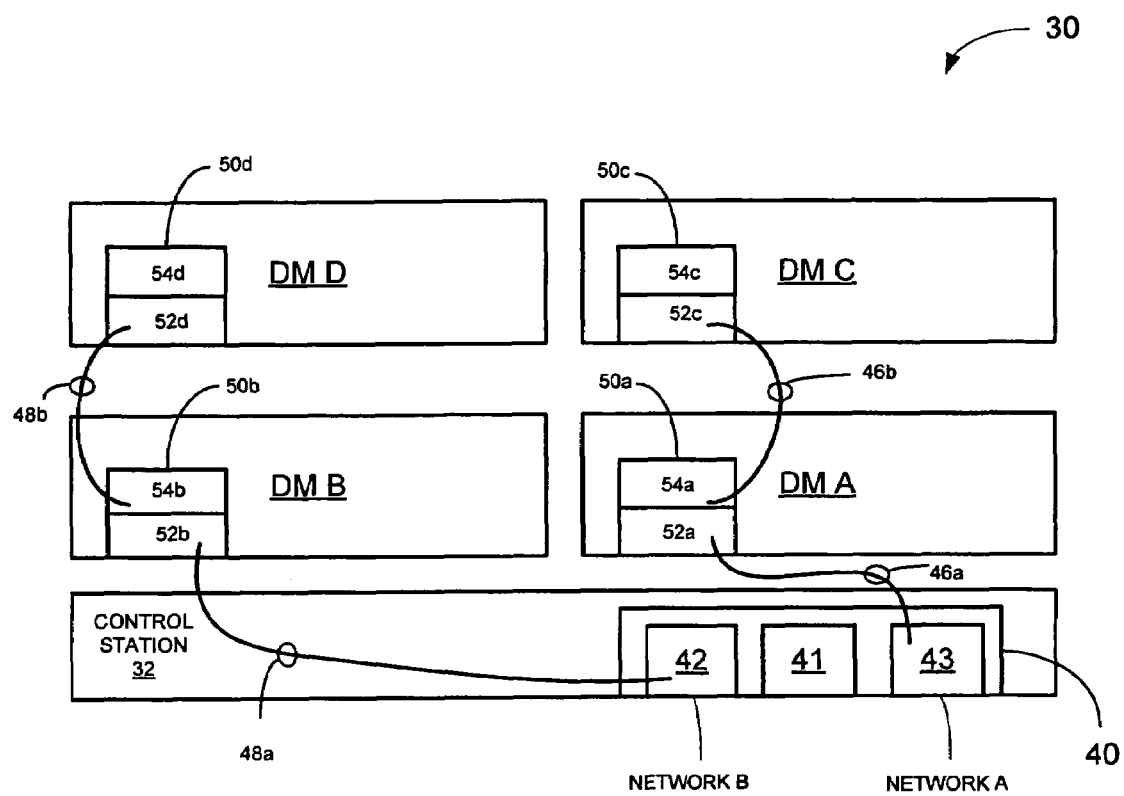
FIG. 4 is a block diagram illustrating a scalable, high availability NAS of the present invention.

Referring now to FIG. 4, a diagram illustrating one embodiment of a high availability Network Attached Storage (NAS) architecture 30 according to the present invention is shown. The NAS architecture 30 is shown to include a control station 32. The control station includes logic having functionality for retrieving operating status information from each coupled file server, or data mover. In one embodiment, the operating status information includes, among other items, information regarding the operational status of the operating system software running on each data mover and the availability of each data mover.

The control station 32 includes an interface card 40, which is, for example, a Peripheral Component Interconnect (PCI) card, having a number of ports 41, 42 and 43. Communication methods that are used by the control station to transfer data using the PCI card are well known in the art. The particular ports of the PCI card are described in more detail below.

Coupled the control station 32 are data movers DM A, DM B, DM C and DM D. The data movers may be, for example, front end data moving enclosures provided in the Celerra line of products by EMC Corporation. The data movers serve to retrieve data from a coupled storage device (not shown), and therefore provide, among other functions, file server, data management and data integrity functionality. It should be noted that, although the particular embodiment is discussed with regard to data movers, the present invention is equally applicable to any processing device that is used to transfer data, and thus the present invention is not limited to any particular implementation of the enclosure.

The present invention distributes the switching functionality of the prior art onto the individual data movers DM A, DM B, DM C and DM D to form a single field replaceable unit, or "FRU". Thus, integrated into each data mover DM A, DM B, DM C and DM D is a switch, shown at 56 in FIG. 6 and a port device 50a, 50b, 50c and 50d, respectively. By providing a switch 56 in each data mover, access to the data movers by the control station 32 can be assured even in the event of a single point of failure at one switch. Thus, the on-board switch 56 in each data mover insures that high availability reliability can be met.

Each switch 56 is used to chain together the data movers to enable communication between the control station 32 and the data movers with a minimal amount of cabling overhead. Each port device 50a, 50b, 50c and 50d includes a downstream input port 52 for receiving data from an upstream device and inputting it to the associated switch, and an upstream output port 54 for forwarding data to the switch of a coupled downstream device. Downstream input port 52 and upstream output port 54 are preferably RJ-45 sockets coupled to the air dam (not shown) of the data mover. For the purposes of this description, the upstream direction is towards the control station 32, and the downstream direction is away from the control station 32.

Referring again to the control station 32, the interface card 40 of the control station is shown to include three ports 41, 42 and 43. In one embodiment of the invention, the three ports include two redundant networking ports 42 and 43 and a heartbeat LAN port 41. The two networking ports 42 and 43 provide high availability accessibility to the data moving enclosures by the control station 32 through two networks. As shown in FIG. 4, networking port 43 connects a LAN Network A to data movers DM A and DM C through cables 46a and 46b, respectively, and networking port 42 connects a LAN Network B to data movers DM B and DM D through cables 48a and 48b, respectively. In the event of a failure at one of the ports 42 or 43, access to the data movers by the control station may still be achieved using the alternate port. As is described below with reference to FIG. 6, each data mover is accessible to every other data mover, either through their switches 56 or through a midplane connection.

Figure 5:
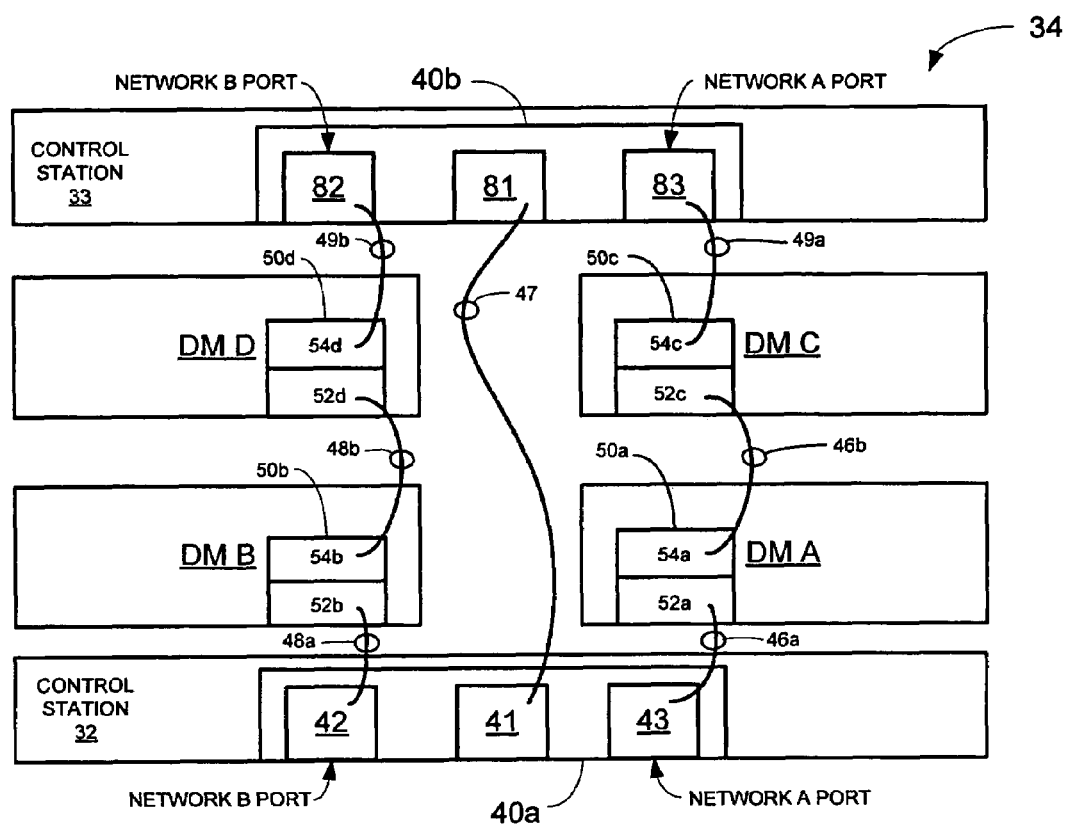
FIG. 5 is a block diagram illustrating another embodiment of a scalable, high availability NAS of the present invention.

In the NAS architecture 30 of FIG. 4, only one control station 32 operates to gather the operation status information at any given time. A redundant control station 33, shown in the NAS architecture 34 in FIG. 5, may be utilized to monitor the operational status of the operating control station 32 using the heartbeat LAN connection 47, between heartbeat LAN port 41 of control station 32 and heartbeat LAN port 81 of control station 81. Control station 32 periodically issues a pulse, or heartbeat, to indicate its operating status. In the event of the failure of the operating control station 32, the redundant control station 33 detects the loss of heartbeat, and can signal the failure and take over control station operation. As shown in FIG. 5, Network A is coupled to upstream port 54c of data mover DM C from Network A port 83 via cable 49a and Network B is coupled to upstream port 54d of data mover DM D from Network B port 82 via cable 49b.

In one embodiment of the invention, the amount of cabling between enclosures is further reduced by forwarding RS485 signals on unused signal lines of the Ethernet cable. Thus each networking port such as port 42 is capable of communicating both 100 Mbit Ethernet signals and serial RS485 signals. Such an embodiment could be implemented in a system wherein 1 Gigabit Ethernet cabling is used, but communication is only performed between the enclosures at a 100 Mbit rate. In such a configuration, as described in the IEEE standard 802.3z, incorporated herein by reference, two of the signal wires are unused. In one embodiment of the invention, the control station includes logic to overlay the RS485 signals on the unused Ethernet signal wires, thereby further reducing by half the cabling and switching logic illustrated in FIG. 4.

FIG. 4 illustrates an NAS system and architecture that is highly flexible; by distributing the switching functionality to the individual data movers, data movers may be added indefinitely to achieve increased storage, performance or reliability without physical constraints.

Figure 6:
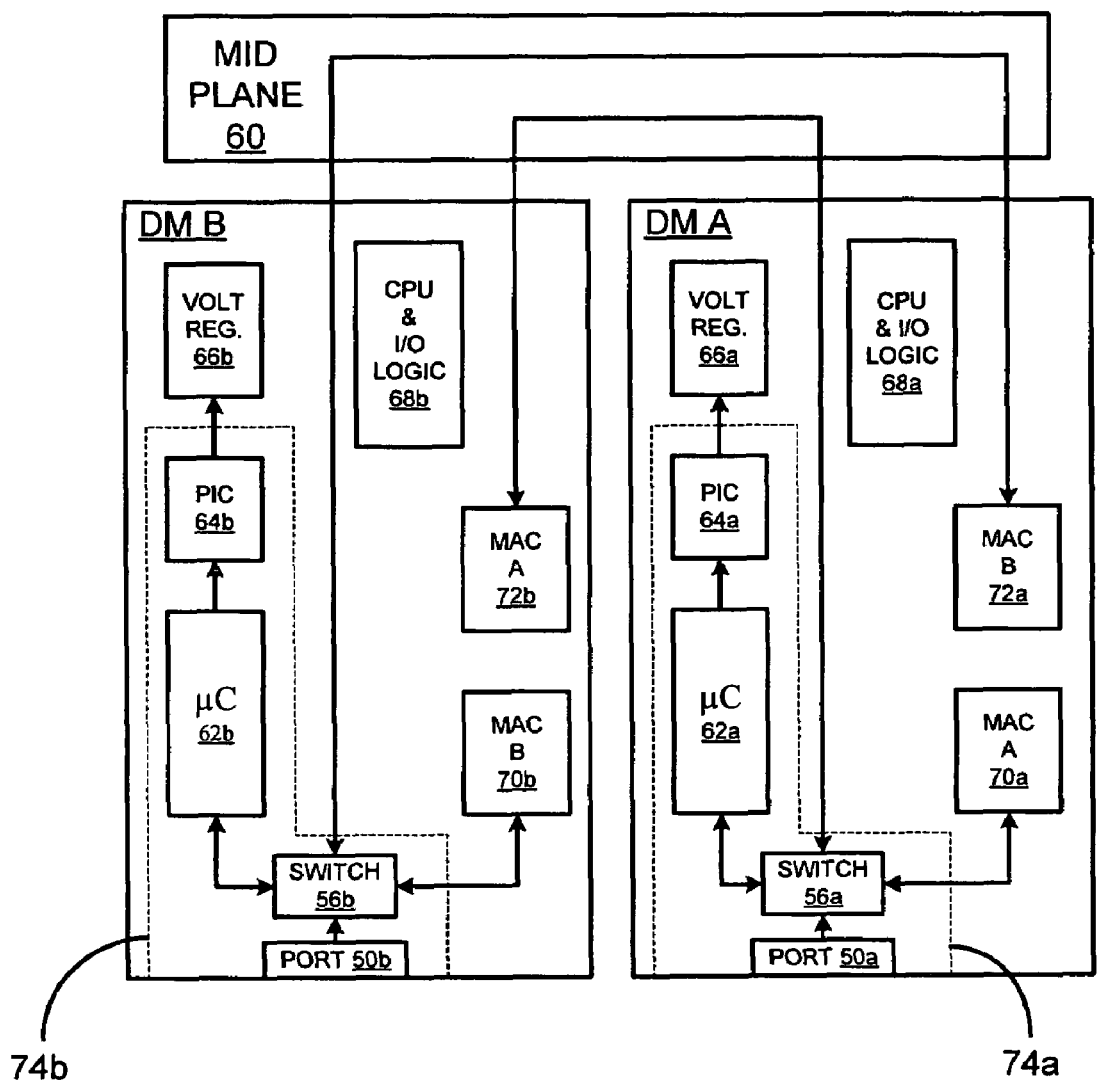
FIG. 6 illustrates an alternative view of the NAS of FIG. 4, showing a top-down view of two of the data movers.

FIG. 6 is a schematic block diagram showing a "top down" view of data movers DM A and DM B, showing internal components and their connection to each other through a midplane 60. As shown in FIG. 6, each data mover includes its port device 50, a switch 56, a microcontroller μC 62, a power controller or PIC 64, voltage regulators 66, one or more CPUs, I/O logic 68 and a pair of addressing devices, MAC A 70 and MAC B 72. All of these components are formed on a single board to form a FRU.

In one embodiment of the invention, switch 56 is a model BCM5325 switch from Broadcom Corporation of Irvine, Calif. However, it will be understood that any switch that operates in a compatible manner may be utilized. The voltage regulators 66 operate to provide power to the CPUs and I/O logic 68 and addressing devices, MAC A 70 and MAC B 72. While not all connections between the components in each data mover are shown, one of ordinary skill in the art will know the interconnections between the elements that are not shown.

Commands from the control station 32 input to data mover DM A at switch 56a can be communicated to the microcontroller 62a, MAC A 70a and, through the midplane 60, to MAC A 72b. Likewise, commands from the control station 32 input to data mover DM B at switch 56b can be communicated to the microcontroller 62b, MAC B 70b and, through the midplane 60, to MAC B 72a.

On occasion, it is desirable for a data mover to be powered down, for example, for maintenance or replacement. Likewise, a data mover in a NAS system may be used as a back-up device that must be powered up when needed. When a data mover is to be powered down, the control station 32 sends a power down command to the data mover through its associated network cable and port 50. Switch 56 forwards the command to the microcontroller 62, which sends the power down command to the PIC 64. Upon receiving the power down command from the microcontroller 62, PIC 64 sends a disable signal to the voltage regulators 66 that provide power to the remainder of the data mover, including the CPU and I/O logic 68 and the MACs 70 and 72, thus powering down the data mover.

However, because the switch 56 must be powered to receive commands from the control station 32 when the data mover is in a powered down state, the switch 56, microcontroller 62 and PIC 64 are not powered by voltage regulator 66, but are powered by a different voltage regulator (not shown) which always provides power to these components. As shown in FIG. 6, these components are mounted in an "always on" portion 74 of the data mover and thus receive power regardless of the on or off state of the data mover.

Accordingly, the present invention incorporates switches onto each data mover in order to create a single field replaceable unit, or "FRU", that contains the functionality of the data mover along with the switching function that was previously handled on a separate board. To enable the switch portion of the FRU to process power up and power down commands from the control station, the switch, microcontroller and PIC are separately powered and are in an "always on" state.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A network attached storage system comprising:
   at least a first data moving device coupled to a control station for receiving communications from the control station, each data moving device including a board having mounted thereon a file server portion and a power control portion, wherein the power control portion receives a continuous power supply and controls the application of power to the file server portion based on communications from the control station; and
   wherein the power control portion comprises a switch for receiving communications from the control station and, based on the nature of the communications, transmitting them to the power control portion or the file transfer portion of the data moving device.

2. The system of claim 1 wherein the power control portion further includes a power control device and wherein the file server portion includes voltage regulators that supply power to components of the file server portion;
   wherein the power control device receives instructions from the control station through the switch and is configured to disable the voltage regulators to power down the file server portion and to enable the voltage regulators to power up the file server portion.

3. The system of claim 2 wherein communications between the control station and the switch are based on the Ethernet protocol.

4. The system of claim 3 further including a second data moving device coupled to the first data moving device through a midplane, wherein the first data moving device switch is configured to transmit communications directly to a first addressing device within the file server portion of the first data moving device and to a first addressing device within the file server portion of the second data moving device through the midplane.

5. The system of claim 4 wherein the second data moving device switch is configured to transmit communications directly to a second addressing device within the file server portion of the second data moving device and to a second addressing device within the file server portion of the first data moving device through the midplane.

6. A method of controlling power in a data storage system comprising:
   A. receiving communications at a switch of a data moving device from a control station, the data moving device including a board having mounted thereon a file server portion and a power control portion, wherein the power control portion, including the switch, receives a continuous power supply;
   B. processing the communication in the switch to determine whether the communication is a data communication to be forwarded by the switch to the file server portion or a power communication to be forwarded to the power control portion;
   C. the switch forwarding a power communication to a power control device in the power control portion;
   D. the power control device, based on the power communication, either disabling voltage regulators in the file server portion to power down the file server portion or enabling the voltage regulators to power up the file server portion.

\* \* \* \* \*